US005341973A

United States Patent [19]

Dawes et al.

[11] Patent Number: 5,341,973

[45] Date of Patent: Aug. 30, 1994

[54] ANATOMIC LOW PROFILE PACK SYSTEM WITH QUICK RELEASE FIRE SHELTER

[75] Inventors: Kerry G. Dawes; Robert J. Early, both of Palo Cedro, Calif.

[73] Assignee: Eagle Gear, Redding, Calif.

[21] Appl. No.: 41,945

[22] Filed: Apr. 2, 1993

Related U.S. Application Data

[62] Division of Ser. No. 801,756, Dec. 3, 1991, abandoned.

[51] Int. Cl.⁵ ........................ B65D 83/00; B65G 59/00

[52] U.S. Cl. .................................... 224/196; 224/209; 221/185

[58] Field of Search ............... 224/196, 209, 235, 236, 224/242; 244/147, 148, 149; 221/185, 50

[56] References Cited

U.S. PATENT DOCUMENTS

| | | | |
|---|---|---|---|
| 2,149,540 | 3/1939 | Muller | 244/148 X |
| 4,541,556 | 9/1985 | Collins et al. | 224/196 |
| 4,858,797 | 8/1989 | Rabska | 224/250 X |
| 4,898,346 | 2/1990 | Ertler | 244/149 X |
| 4,925,070 | 3/1990 | Tulgan | 224/209 |
| 5,056,683 | 10/1991 | O'Brien et al. | 221/185 X |

*Primary Examiner*—Glenn T. Barrett
*Attorney, Agent, or Firm*—Majestic, Parsons, Siebert & Hsue

[57] ABSTRACT

A low profile backpack system is provided which includes a mechanism for allowing free movement of the shoulder straps as the wearer moves, bends, twists from side to side, etc. The inventive mechanism comprises a buckle having a pair of transverse elongated slots. The buckle is fixed to the top of the pack by means of a single vertically oriented strap which passes through the lower of the two slots. A second strap passes through the upper slot and has its ends fixed to an end of each of two shoulder straps adapted to fit over the shoulders of the wearer. A further inventive feature is the provision of a quick release fire shelter on the pack which may be deployed by one hand. The shelter is stored in a rectangularly shaped pouch depending from the bottom of the pack. An open end of the pouch is selectively closed by a flap secured by Velcro fasteners. Pulling a release strap depending from the pouch first disengages the fasteners. Further pulling of the release strap causes the folded safety tent to be ejected from a plastic housing in which it is stored within the pouch.

8 Claims, 2 Drawing Sheets

ANATOMIC LOW PROFILE PACK SYSTEM WITH QUICK RELEASE FIRE SHELTER

This is a division of application Ser. No. 07/801,756, filed Dec. 3, 1991, now abandoned.

FIELD OF THE INVENTION

This invention relates to a backpack system especially adapted for use in fighting forest fires. In particular, it includes a shoulder strap adjustment mechanism which accommodates movement and bending of the wearer. Still further, it includes a quick release fire shelter.

BACKGROUND OF THE INVENTION

Backpacks used by firefighters include a pair of laterally spaced shoulder straps which are fixed to the top of the pack and pass over the shoulders to respective attachment points at the bottom of the pack. The packs may include a back panel which is adapted to contact the wearer's back, and a front panel spaced away from the wearer's back. A bottom panel connects the lower edge of the front panel with the lower edge of the back panel. A side panel extends from the left side of the bottom panel to the right side of the bottom panel. The panels are typically sewn together to form the pack and connect the shoulder straps. At least one zippered opening is provided to enable accessing the pack.

Typically, the shoulder straps have their upper free ends sewn to the top of the back panel. The lower free ends may be directly sewn to the lower back panel or to the side panel. Alternatively, a waist strap adapted to encircle the waist of the wearer is fixed to the lower back panel as by sewing. A releasable buckle permits the free ends to be secured together and adjustment buckles are provided to take up slack. Such adjustment buckles may also be provided to take up slack in the shoulder straps. If desired, the lower free ends of the shoulder straps may terminate and be fixed to the waist strap where one is provided.

In defending against forest or grass fires, firefighters frequently use shovels or trenching tools and operate these in a bent or at least partially bent over position. The firefighters' shoulders are frequently alternated in position, with first the left, then the right forward, and then back. With conventional backpacks, this necessary movement is inhibited by the fixed connection of the shoulder straps to the top of the pack. Since the shoulder straps with these conventional backpacks stay in one place, wearing them for many hours on the fireline can become uncomfortable and tiring. This reduces firefighter effectiveness.

Firefighters must also frequently carry a safety tent in a folded condition for quick deployment if a fire should suddenly turn on them. Such safety tents typically have a metallized surface which is fire resistant. When threatened, the firefighter has to remove his or her pack, unzip the pack flap, locate the safety tent in the pack, remove it from the pack and then deploy it. Alternatively, if the tent is stored within a pouch worn on the belt, the firefighter must open the pouch and pull the shelter vertically out of the pouch. This is difficult, especially in a panic situation and when wearing gloves. The firefighter then enters the tent and is protected as the fire passes over and around the tent. Since seconds may literally mean the difference between life and death, it is essential that the tent be deployed in the shortest possible time. Conventional packs thus described do not satisfy this need.

SUMMARY OF THE INVENTION

The invention takes the form of a low profile backpack system which includes a mechanism for allowing free movement of the shoulder straps as the wearer moves, bends, twists from side to side, etc. The invention comprises a buckle having a pair of elongated, transverse slots. The buckle is fixed to the top of the pack by means of a single vertically oriented strap. The upper end of the strap passes through the lower slot of the buckle and is sewn or otherwise fixed to itself. A second strap passes through the upper slot. The free ends of this strap are each sewn or otherwise fixed to an end of each of two shoulder straps adapted to fit over the shoulders of the wearer. Since the second strap is free to move with relation to the upper slot of the buckle, movement of the wearer is accommodated. A feature of this construction is that movement of one shoulder strap in one direction is automatically compensated for by a movement of the other shoulder strap in the opposite direction. Thus the construction is in perfect symmetry.

A further feature of the invention is the provision of a quick release fire shelter on the pack which may be operated with one hand. The quick release fire shelter is located in a generally rectangularly shaped pouch depending from the bottom of the pack. A flap closure on the right side of the pouch is opened by means of a release strap which is easily accessed by the wearer reaching down and behind. Pulling the release strap disengages a Velcro fastener which normally holds the flap closure closed. Continued hand movement of the release strap then causes the folded safety tent to be ejected from a plastic housing in which it is stored within the pouch. All of this may be done with one hand, leaving the other free for holding tools or other implements.

DETAILED DESCRIPTION

Figure 1:
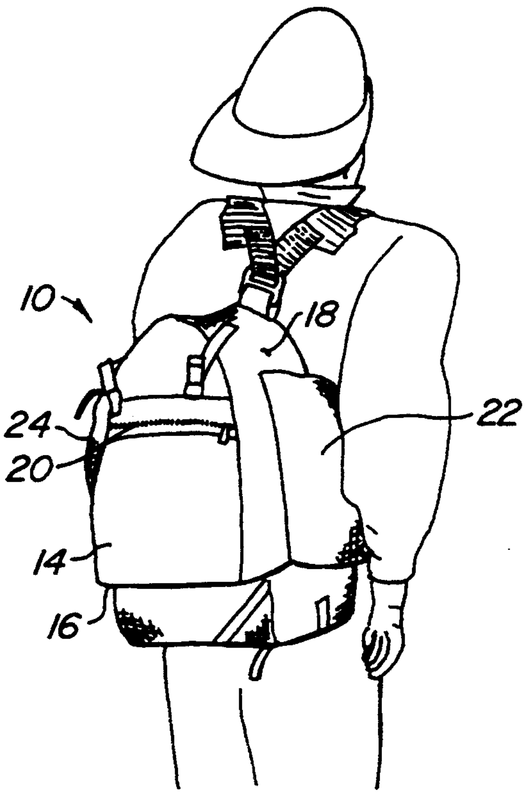
FIG. 1 is an overall top quarter isometric view of the invention worn on the back of a firefighter.
Figure 2:
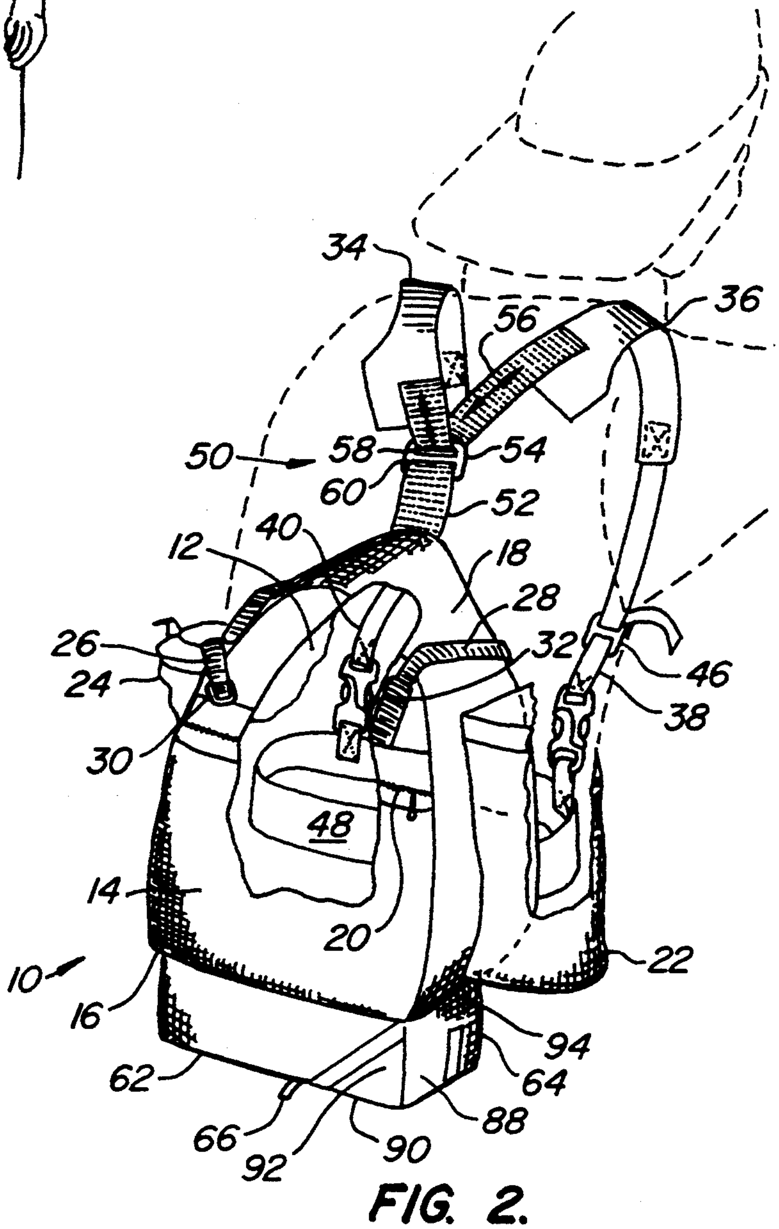
FIG. 2 is an enlarged view, similar to the preceding figure, of the inventive backpack partially cut away to show details, with a firefighter shown in dotted lines for placement purposes.

As shown in FIGS. 1 and 2, the inventive backpack shown generally at 10 is of generally rectangular configuration having a back panel 12, front panel 14 and side panel 18, all joined together along their edges by sewing or other convenient fastening means. A transverse zipper in an accommodating opening in the back panel permits access to the interior of the pack. A pair of open-ended canisters are sewn or otherwise fixed to the opposite sides of the pack 10. These may conveniently contain items that must be readily accessed by the wearer, such as flares for starting backfires. A pair of equipment straps 26, 28 having quick release fasteners 30, 32 are fixed to the top of the pack. These are useful for retaining equipment on the exterior of the pack.

A pair of padded shoulder straps are adapted for passing over the shoulders of the wearer. One end 38, 40 of these padded straps is connected to one side of a quick release fastener 42, 44. An adjustment buckle associated with each strap, one of which is shown at 46, permits adjustment of the length of the subject strap to suit the wearer. Each quick release fastener is fixed, in turn, to a transverse waist belt 48. Waist belt 48 is fixed to the back panel 12.

Attaching of the shoulder straps 34, 36 to the pack is by way of an adjustment mechanism shown generally at 50. The adjustment mechanism is comprised of a vertically oriented support strap 52, a buckle 54, and an adjustment strap 56. Adjustment strap 56 is a generally elongated strap which freely passes through an upper, transverse slot 58 in buckle 54. The free ends of adjustment strap 56 are fixed to shoulder straps 34, 36, respectively. Vertical strap 52 passes through lower transverse slot 60 in buckle 54 and is fixed to itself. In this manner, buckle 54 is restrained with respect to the pack while the shoulder straps 34, 36 are free to move to accommodate the bending, twisting, turning, etc. of the wearer.

Figure 3A:
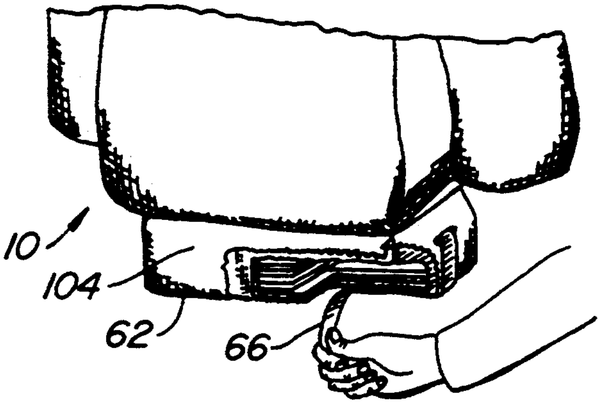
FIG. 3 is a top quarter isometric view of the lower part of a backpack illustrating the depending pouch partially cut away and showing the release strap just prior to opening of the flap closure.
FIG. 3B is a side elevation view of the pouch partially cut away to show details thereof with the release strap and flap closure pulled from its initial phantom line position.
FIG. 3C is a side elevation view of the same showing the release strap in an intermediate position wherein the fire shelter is partially extended from its housing within the pouch.
FIG. 3D is a side elevation view of the same with the release strap fully advanced and the fire shelter ejected from its housing.
FIG. 3E is a cross-sectional view taken along lines 3E—3E in FIG. 3B.

The quick release fire shelter will now be described. Depending from the bottom 16 of pack 10 is a generally rectangular pouch 62. The pouch has a closure flap 64 on its right end and a release strap 66 depending therefrom in a position readily grasped by the right hand of the wearer reaching down and behind. See: FIG. 3A.

Parenthetically, it may be understood that the pack, pouch, straps, etc. may be made of fabric material such as Nylon. The panels may be made from the Nylon material having the brand name Cordura. Shown contained within a rectangular box-like housing 68 within the similarly shaped pouch is a folded "fire shelter" tent 68. The safety tent is conventional and may be like that sold by Anchor Industries, Inc. as NSN 4240-01-123-1616. The tent loosely fits within housing 68 and is contained within its own plastic bag, having a quick release ring 70 for ultimate deployment after it has been removed from the housing by the release strap 66.

Figure 3B:
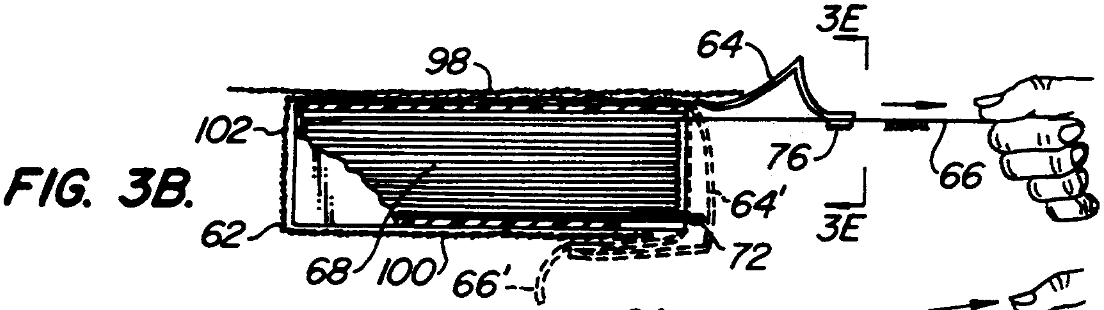
Figure 3C:
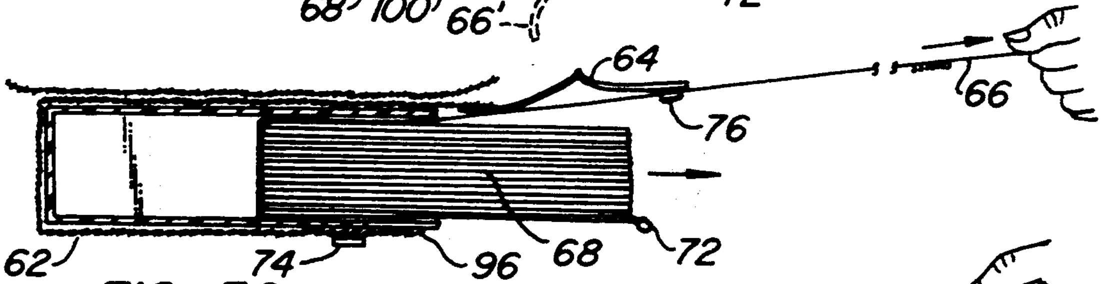
Figure 3D:
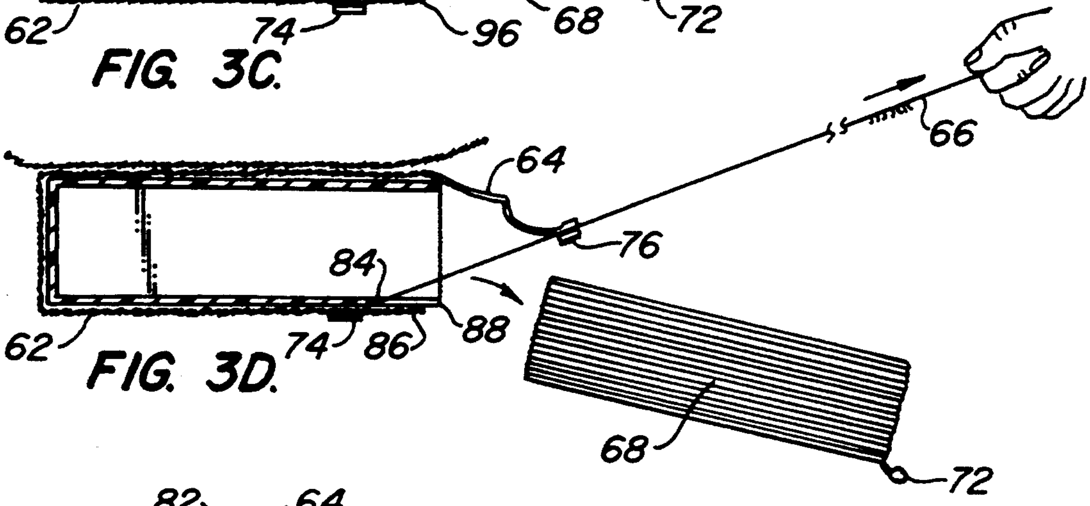
Figure 3E:
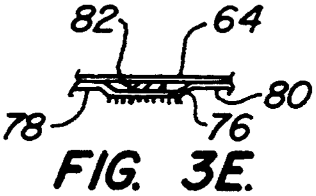

As may be seen in this figure and in FIGS. 3C through 3E, the release strap first functions to disengage hook and loop type fasteners 74, 76 which are commonly referred to as "VELCRO" type fasteners which are engaged when the flap is in its closed, protective position shown in phantom line in FIG. 3B and in solid line in FIG. 3A. As shown in FIG. 3E, "VELCRO" fastener 74 is an elongated strip of web material fixed at its ends to flap closure 64, but leaving an aperture 82 through which release strap 66 is freely movable. Release strap 66 passes around tent 68 and has its opposite end 84 fixed to the inner wall 86 of pouch 62. A slot 88 in the side of housing 70, which may be of plastic material, facilitates the connection of the release strap end to the inner wall. As best seen in FIG. 2, closure flap 64 includes an end panel 88, and a bottom panel 90 joined by two triangularly shaped side panels, one of which is shown at 92. The closure flap is fixed or otherwise connected to the bottom panel 16 of the pack along a line denoted 94.

As seen in FIG. 3B, the closure panel 64' thus selectively closes opening 96 in the right end of pouch 62. The pouch 62 itself is made up of a rectangular top panel 98, joined to a rectangular bottom panel 100 by means of an end panel 102, and front and back panels. Front panel 104 is seen in FIG. 3A.

It is to be understood that while the invention has been described above in conjunction with the preferred specific embodiments, the description and examples are intended to illustrate and not limit the scope of the invention, which is defined by the scope of the appended claims.

What is claimed is:

1. In a pack system having a backpack and means for mounting said backpack on a wearer, wherein the improvement comprises a pouch adapted for containing a separate structure to be deployed, said pouch being mounted on said backpack and including a discharge opening therein, closure means for selectively closing said opening and release means for opening said closure means and ejecting said separate structure from said discharge opening.

2. The invention of claim 1 wherein said closure means comprises a flap and further including fastener means on said flap for releasably securing said flap in a closed position over said discharge opening.

3. The invention of claim 1 wherein said release means comprise a release strap having a pair of opposite ends, said pouch having an interior wall, one end of said release strap being fixed to said wall adjacent to said opening, said release strap passing around said structure so that pulling of the other end of said release strap causes the strap to straighten out and eject said structure from said pouch.

4. The invention of claim 3 further including a housing within said pouch for containing said structure, said housing having an opening therein for dispensing said structure, and wherein said release strap passes around said structure within said housing.

5. The invention of claim 3 wherein said flap includes an end wall, a bottom wall joined thereto, and a pair of triangularly shaped side walls joined to said end and bottom walls.

6. The invention of claim 5 wherein said fastener means comprises a fastener on said bottom wall of said flap which cooperates with a fastener on said pouch.

7. The invention of claim 6 wherein said fastener on said bottom wall of said flap comprises a strip of web material, said web material defining a pair of opposite ends and being fixed to said flap adjacent its ends so as to provide an aperture for said release strap to pass through, and wherein said other end of said release strap extends through said aperture, whereby said other end of said release strap is positioned to be grasped underneath said pouch.

8. The invention of claim 6 wherein said fastener on said bottom wall and on said pouch are made of hook and loop fastener material.

* * * * *